(12) United States Patent
Jaisimha et al.

(10) Patent No.: US 9,699,561 B2
(45) Date of Patent: *Jul. 4, 2017

(54) MENU NAVIGATION METHOD FOR USER OF AUDIO HEADPHONES

(71) Applicant: Panasonic Automotive Systems Company of America, Division of Panasonic Corporation of North America, Peachtree City, GA (US)

(72) Inventors: Shree Jaisimha, Senoia, GA (US); Mohammed Reza Kanji, Brampton (CA); Li Lian Lay, Urbana, MD (US); John Morris, Fayetteville, GA (US); James P. Reefe, Peachtree City, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 652 days.

This patent is subject to a terminal disclaimer.

(21) Appl. No.: 13/713,462

(22) Filed: Dec. 13, 2012

(65) Prior Publication Data

US 2013/0216045 A1 Aug. 22, 2013
US 2014/0198917 A2 Jul. 17, 2014

Related U.S. Application Data

(63) Continuation of application No. 12/322,258, filed on Jan. 30, 2009, now Pat. No. 8,363,866.

(51) Int. Cl.
*H04R 5/00* (2006.01)
*H04R 5/04* (2006.01)
(Continued)

(52) U.S. Cl.
CPC ............. *H04R 5/04* (2013.01); *H04S 7/30* (2013.01); *B60K 2350/901* (2013.01);
(Continued)

(58) Field of Classification Search
CPC .......... H04S 5/00; H04S 2420/01; H04S 7/30; H04S 2400/11; H04S 2400/01
(Continued)

(56) References Cited

U.S. PATENT DOCUMENTS 7,058,168 B1 * 6/2006 Knappe et al. .......... 379/204.01
2006/0251263 A1 11/2006 Vronay
(Continued)

FOREIGN PATENT DOCUMENTS

JP 2003-257162 9/2003
JP 2008-092193 4/2006
(Continued)

*Primary Examiner* — Alexander Jamal
(74) *Attorney, Agent, or Firm* — Laurence S. Roach, Esq.

(57) ABSTRACT

A method of operating an audio system having first and second sources includes outputting a first audio signal from the first source on first and second speakers. In response to a listener input, the first audio signal and a second audio signal from the second source are output simultaneously on the first and second speakers. The first signal is output from each of the first and second speakers such that the first signal is perceived by a listener to originate from a first direction toward the listener. The second signal is output from each of the first and second speakers such that the second signal is perceived by the listener to originate from a second direction toward the listener. The second direction is offset at least ninety degrees from the first direction.

20 Claims, 6 Drawing Sheets

(51) Int. Cl.
   *H04S 7/00* (2006.01)
   *G06F 3/16* (2006.01)
   *H04R 1/10* (2006.01)

(52) U.S. Cl.
   CPC .............. *G06F 3/16* (2013.01); *H04R 1/1041* (2013.01); *H04R 2499/13* (2013.01); *H04S 2400/13* (2013.01); *H04S 2420/01* (2013.01)

(58) Field of Classification Search
   USPC ........................................ 381/17, 21, 22, 23
   See application file for complete search history.

(56) References Cited

U.S. PATENT DOCUMENTS

| | | | |
|---|---|---|---|
| 2007/0276908 A1* | 11/2007 | Asthana et al. | 709/204 |
| 2008/0195397 A1* | 8/2008 | Myburg et al. | 704/500 |
| 2008/0228299 A1 | 9/2008 | Ikeda et al. | |
| 2010/0027719 A1* | 2/2010 | Pahuja | 375/340 |

FOREIGN PATENT DOCUMENTS

| | | |
|---|---|---|
| KR | 10-2008-0096591 A | 10/2008 |
| WO | 00/24226 | 4/2000 |
| WO | 2007106551 A1 | 9/2007 |

\* cited by examiner

MENU NAVIGATION METHOD FOR USER OF AUDIO HEADPHONES

CROSS-REFERENCE TO RELATED APPLICATION

This application is a continuation of U.S. patent application Ser. No. 12/322,258, filed on Jan. 30, 2009, now U.S. Pat. No. 8,363,866, issued on Jan. 29, 2013, the disclosure of which is hereby incorporated by reference in its entirety for all purposes.

COPYRIGHT NOTICE

Portions of this document are subject to copyright protection. The copyright owner does not object to facsimile reproduction of the patent document as it is made available by the U.S. Patent and Trademark Office. However, the copyright owner reserves all copyrights in the software described herein. The following notice applies to the software described and illustrated herein: Copyright © 2008, Panasonic Automotive Systems Company of America, All Rights Reserved.

BACKGROUND OF THE INVENTION

1. Field of the Invention

The present invention relates to audio menu navigation, and, more particularly, to audio menu navigation when using headphones.

2. Description of the Related Art

With the number of audio sources available in today's multimedia systems increasing rapidly, the number of source based selection options in cars is also increasing. At the present time, some of the source selection options in the car audio applications in the case of rear seat audio applications include the following sources: XM or Sirius (satellite audio), CD, DVD, AM or FM, AUX, Phone, Onstar (U.S. market segment only), USB, High Definition Radio (U.S. market segment only) and DAB (European market segment only).

Currently there is no known innovative system that enables a savvy user to make selections of audio sources more efficiently. A bridge between better human factor engineering and the source selection has not yet arrived to make the navigation easier within and across the navigation sources for the end user.

Consider the case of a single source with USB. Music navigation through the USB flash drive source for example requires the user to be able to traverse one song at a time for the user to decide which song he would like to select. This is a rather cumbersome process, especially with compressed audio wherein the songs can number over one hundred depending on the flash storage content within the USB drive.

Accordingly, what is neither anticipated nor obvious in view of the prior art is a method of enabling a user to more efficiently navigate menus in applications having more than one audio source.

SUMMARY OF THE INVENTION

The present invention may provide a method for a user to listen to two separate sources of audio content simultaneously. Further, the user may navigate the menu of either audio source while listening to both audio sources simultaneously.

The invention may provide an effective, novel and feasible way of enhancing the overall user experience in navigating within and across a multitude of audio sources which may be available to a user of headphones in a rear seat audio application. The invention may further provide a new dimension to user navigation by utilizing three-dimensional audio transforms and multi-instance decoders.

The invention comprises, in one form thereof, a method of operating an audio system having first and second sources, including outputting a first audio signal from the first source on first and second speakers. In response to a listener input, the first audio signal and a second audio signal from the second source are output simultaneously on the first and second speakers. The first signal is output from each of the first and second speakers such that the first signal is perceived by a listener to originate from a first direction toward the listener. The second signal is output from each of the first and second speakers such that the second signal is perceived by the listener to originate from a second direction toward the listener. The second direction is offset at least ninety degrees from the first direction.

The invention comprises, in another form thereof, a method of operating an audio system having first and second sources, including outputting a first audio signal from the first source on the first and second speakers. In response to a listener input, the first audio signal and a second audio signal from the second source are simultaneously output on the first and second speakers. The first signal is output from each of the first and second speakers such that the first signal is perceived by a listener to originate from a first direction toward the listener. The second signal is output from each of the first and second speakers such that the second signal is perceived by the listener to originate from a second direction toward the listener. The listener is enabled to audibly navigate through menu selections of the second source while continuing to listen to the first source.

The invention comprises, in yet another form thereof, a method of operating an audio system, including receiving first and second monaural signals associated with first and second sources, respectively. The first and second monaural signals are transformed into respective first and second stereo signals. The first and second stereo signals are each spatialized to a respective angle of trajectory. The first and second stereo signals each have a left channel and a right channel. Asynchronous sample rate conversion is performed on the left and right channels of each of the first and second stereo signals. The left channels of the first and second stereo signals are combined into a combined left channel signal. The right channels of the first and second stereo signals are combined into a combined right channel signal. Gains of the combined left channel signal and the combined right channel signal are adjusted. The gain-adjusted combined left channel signal and the gain-adjusted combined right channel signal are simultaneously output on the first and second speakers.

An advantage of the present invention is that a user may temporarily listen to and navigate through a second audio source while continuing to listen to a first audio source that is on a commercial break. The user may then go back to listening to the first audio source exclusively when the commercial break ends.

Another advantage is that the invention provides an innovative solution for radios with rear seat audio to improve their navigation ability across and within sources and represents a paradigm shift in user navigation in line with advances in Human Machine Interaction in car audio systems.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
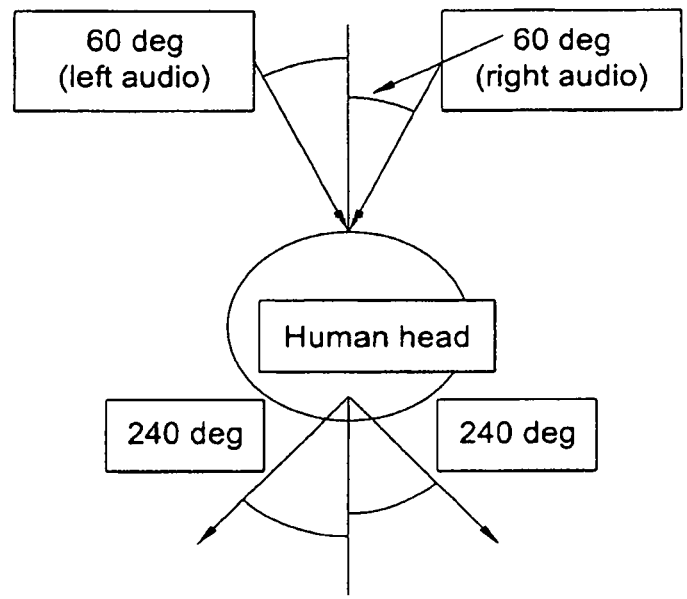
FIG. 1 is a schematic diagram illustrating one embodiment of spatial audio as employed in the present invention.

Referring now to the drawings, and particularly to FIG. 1, there is shown a schematic diagram of spatial audio of two stereo audio sources projected to a user who is wearing audio headphones, such as in the rear seat of a motor vehicle. The invention may utilize three-dimensional audio effects to produce spatial localization effects so that up to two sources may be projected simultaneously, thereby enabling faster user selection. In the embodiment of FIG. 1, spatialization of sixty degrees is utilized.

Multiple audio outputs may be achieved within the same source (in one embodiment, USB flash drive) at the same time through multi-instance decoders in a multi-threaded operating system based embedded system. The multi-instance decoders may allow for producing two simultaneous audio sources at the same time in a multi-threaded framework.

A flash file system may be utilized to allow direct access of data recorded in separate flash areas. Utilization of multi-instance decoders each run on a separate thread in a multi-threaded operating system environment makes this possible.

With the use of multi-instance decoders, it is possible to play two songs at the same time. It is also possible to simultaneously project the two audio sources to the rear seat passenger wearing headphones.

In one embodiment, a stereo signal is converted into a mono-signal and then is transformed back to a spatialized stereo signal. The stereo signal may be transformed into a mono-signal by dividing the sum of the left channel and the right channel by two (i.e., (Left Channel+Right Channel)/2). Additional details of sampling rates of different input sources considered in one embodiment of an algorithm of the present invention are provided in the following table:

| Potential Input Sources in Car Audio Systems | Stereo or Mono Determination | Typical Sampling Rates | Method to convert to Mono input signal into spatial Algorithm |
|---|---|---|---|
| FM | Utilization of Pilot Signal. If Pilot Signal exists in the 38 kHz offset, then it is a stereo signal. | 15 kHz | If Stereo, convert to Mono input by using the formula: Output = (Left PCM + Right PCM)/2. If Mono signal is received in FM band, utilize it as input directly. |
| AM | Assumed mono if C-Quam stereo is not utilized. Typically C-Quam is not commonly utilized. | 9 or 10 kHz | Assume as Mono and input it to the algorithm. |
| USB audio | Stereo or mono determination from MP3 header information | Variable rate from as low as 32 kbps up to 128 kbps, information on sampling rate defined in compression algorithm header information | If Stereo. convert to Mono input by using the formula: Output = (Left PCM + Right PCM)/2. If Mono signal is received, utilize it as input directly. |
| DAB Audio | Stereo or mono determination from MP2 header information | 128 kbps | If Stereo, convert to Mono input by using the formula: Output = (Left PCM + Right PCM)/2. If Mono signal is received, utilize it as input directly. |

-continued

| Potential Input Sources in Car Audio Systems | Stereo or Mono Determination | Typical Sampling Rates | Method to convert to Mono input signal into spatial Algorithm |
|---|---|---|---|
| XM Audio | Stereo or mono determination header information prior to going through compressed audio decoder | 128 kbps | If Stereo, convert to Mono input by using the formula: Output = (Left PCM + Right PCM)/2. If Mono signal is received. utilize it as input directly. |
| CD Audio | Check the Table Of Contents Information of the recorded track | 44.1 kHz | If Stereo, convert to Mono input by using the formula: Output = (Left PCM + Right PCM)/2. If Mono signal is received. utilize it as input directly. |

The present invention may, across disparate sources, redefine the source selection pushbutton or key which is presently on current rear seat audio (RSA) systems in the automotive market. The source selection key may enable the user to navigate across sources one source at a time.

Across sources, for example, audio source navigation across disparate sources such as XM and FM audio may require the user to press the source key to go across the sources with the limitation that the user can listen to only one audio source at any point in time before he decides which source program to listen to. The term "disparate sources" may refer to audio sources that can be decoded independently of each other. For example, FM audio output can occur at the same time as XM audio output as the two have independent demodulators and separate antenna sources with no shared dependency that could prevent both audio sources from being output at the same time. The present invention may enable the user to listen to two disparate sources at different angles of arrival in a headphone set and select the audio source he would like to listen to in collaboration with a Human Machine Interface system.

The Human Machine Interface (HMI) of a car audio system may utilize alpha-blending and screen-on-screen techniques to overlap two separate sources together with one in the foreground and the other in the background. Alpha blending is a convex combination of two colors allowing for transparency effects in computer graphics. These video sources typically are independent of each other, and the user may be able to view a second source while listening to a first source. The present invention may be applied to alpha-blending and screen-on-screen techniques to audibly complement these video techniques.

Consider the case where a user is listening to a source that is interrupted by a commercial on that station and would like to browse another source selection with the intention of returning soon to his original source selection. Other than user menu navigation, one embodiment of a method of the present invention may be applied in scenarios in which the user is listening to a source and is interrupted by a commercial in the present audio source. Not wanting to listen exclusively to the commercial, the user actuates a control on the audio system in order to listen to a second audio source while continuing to listen to the first audio source. For example, the user flips a switch or presses a key on the HMI to enable the spatial audio, i.e., the dual audio source mode. In the spatial audio, the user is able to select and listen to a new source but he is still able to simultaneously listen to his previously selected source. The user may tune back to the previously selected source once the commercial ends. While the user is audibly browsing the other station, the original source can be deceased in volume (e.g., 3 dB or 6 dB) by a user-selected menu selection. Thus, the new source may be played louder than the original source while both sources are being played simultaneously.

Although the overall perceived loudness of the new source may be greater than that of the original source, the new source is not necessarily played louder than the original source on both speakers. For example, the new source may be played almost entirely on one of the speakers, while the original source may be played with a more even distribution of loudness between the speakers.

The human hearing system is able to perceive the locations of, i.e., localize, sources of sound through interaural level differences (ILD) and interaural time differences (ITD). ILD comes into play when the intensity of the source signal reaching one ear differs from that reaching the other ear. ILD occurs due to diffraction when the sound waves diffract against the human head.

Figure 2:
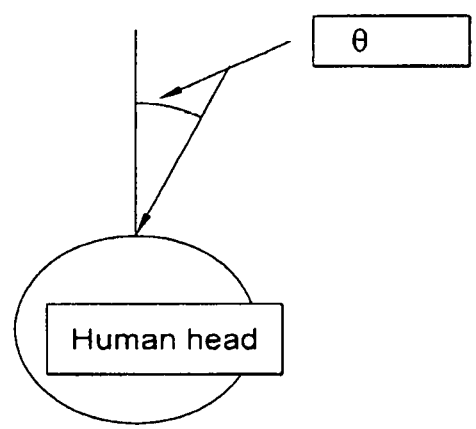
FIG. 2 is a schematic diagram illustrating inter-aural differences calculated for source in the azimuthal plane defined by two ears and a nose.

The interaural level differences with regard to the radio may be expressed in decibels. ILD dominates over ITD with increasing frequency content of the input signal due to the fact that scattering by the human head increases rapidly with increasing frequency. For instance, the wavelength of sound at 500 Hz is 69 cm, which is four times the average diameter of the human head. FIG. 2 illustrates interaural level differences calculated for source in the azimuthal plane defined by two ears and the nose.

Interaural time difference (ITD), on the other hand, applies for localization of sounds having frequencies below 500 Hz and is the result of the difference in arrival times of the sound waveform at the two ears. A phase difference corresponds to an interaural time difference (ITD) of $\Delta t = 3(a/c)\sin\theta$, where $\theta$ is the azimuthal (left-right) angle illustrated in FIG. 2, a is the radius of the human head and c is the speed of sound (34400 cm/sec).

The human binaural system thus performs spatial localization using ILD and ITD cues. In summary, the binaural system is sensitive to amplitude cues from ILD above 500

Hz. These ILD cues become large and reliable for frequencies above 3000 Hz, while ITD cues work well for frequencies below 1500 Hz. For a sine tone of frequency such as 2000 Hz, neither cue works well. As a result, human localization ability tends to be poor for signals in this frequency range.

Starting from the approximation of the head as a rigid sphere that diffracts a planar wave, the head shadow or ITD can be:

$w=c/a$, where $c$ is the speed of sound and $a$ is the radius of the head.

$$\alpha(\theta)=1.05+0.95\cos(180*\theta/150)$$

Figure 3:
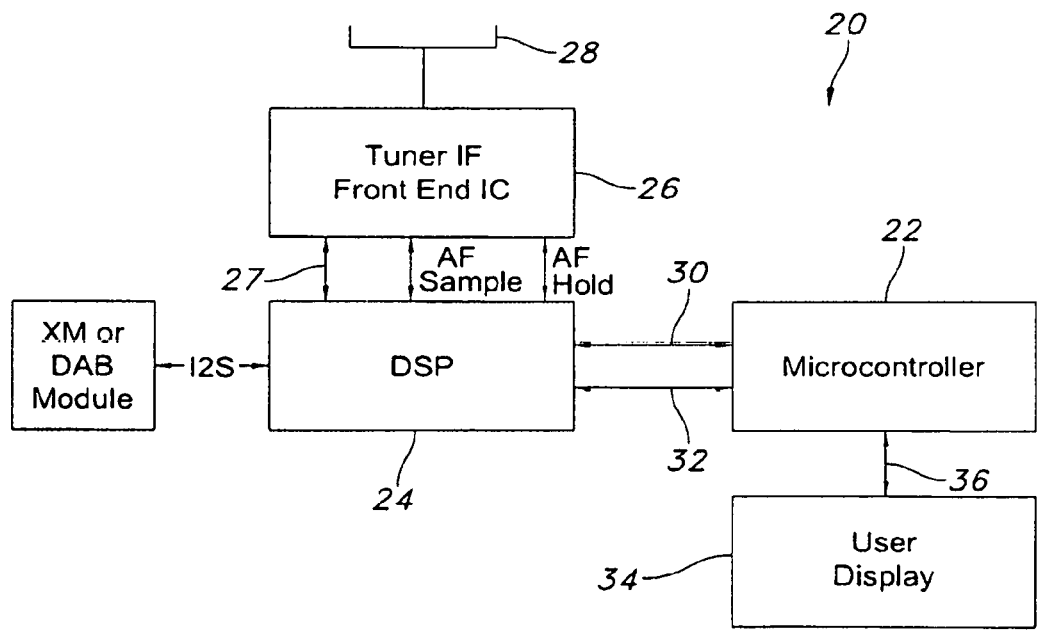
FIG. 3 is a block diagram illustrating one embodiment of a radio system of the present invention.

The position of the zero varies with the azimuth angle θ. The formula above may be translated into a stable infinite impulse response (IIR) digital filter using bilinear transformation:

$$H(z)=[(w+\alpha F_s)+(w-\alpha F_s)z^{-1}]/[(w+F_s)+(w-F_s)z^{-1}]$$

Where $w=c/a$ $\tau_h(\theta)=-a\cos(\theta)/c$ if $0|\theta|<\pi/2$, or $\tau_h(\theta)=-a(|\theta|-\pi/2)/c$ if $\pi/2\leq|\theta|<\pi$ Referring to FIG. 3, there is shown one embodiment of a vehicle rear seat radio system 20 of the present invention including a microcontroller 22 that may be used to process user input. A digital signal processor (DSP) 24 may be used to provide audio demodulation of the air-borne IF input signal. DSP 24 may also be used to provide quality information parameters to the main microcontroller 22 via a serial communication protocol such as I2C. The quality information parameters may include multipath, adjacent channel noise, and field strength. DSP 24 may rely on a Tuner IC 26 to perform the front end RF demodulation and the gain control. Tuner IC 26 may also output the Intermediate Frequency to DSP 24 where the Intermediate Frequency may be demodulated and processed. Tuner IC 26 may further provide a gain to the IF (Intermediate Frequency) of up to 6 dBuV prior to forwarding the signal to DSP 24. Communication between Tuner IC 26 and DSP 24, as indicated at 27, may be via a serial communication protocol such as I2C, which may operate at 400 kbps.

An antenna system 28 may be communicatively coupled to Tuner IC 26. Antenna system 28 may be in the form of a passive mast, or an active mast of phase diversity, for example.

DSP 24 may provide signal quality parameterization of demodulated tuner audio and may make it available to microcontroller 22 via a serial bus 32. In one embodiment, serial communication bus 32 is in the form of a 400 kbps high speed I2C. A radio data system (RDS) interrupt line 30 may also be provided between DSP 24 and microcontroller 22.

Microcontroller 22 may in turn link, as at 36, to a touch screen HMI display 34, which enables the user to select the source that he wants to listen to. HMI display 34 in particular may provide the source selection with display cues which may highlight the spatial angle.

Within the software architecture inside microcontroller 22, operation is conducted in a multithreaded system. The application may run on a thread on main microcontroller 22.

It may be difficult for DSP 24 to operate in a sample-by-sample based system. To avoid this, a fixed ping pong buffer may be utilized to collect the samples and process the data in a frame. The input signal can be either a stereo or a monotone signal. If the input is a stereo signal, the algorithm may require the input signal to be converted to a monotone input signal before processing.

The conversion of a stereo signal to a monotone, i.e., monaural, signal before processing may be achieved as described in the table provided and discussed above. The software may ascertain the type of source at play based on the current mode.

Figure 4A:
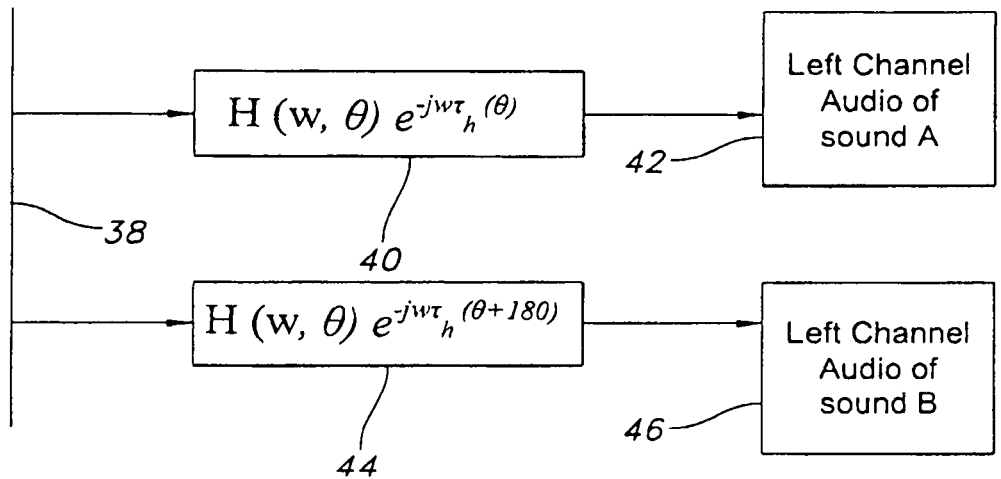
FIGS. 4A and 4B are block diagrams illustrating transformation of mono-signals into stereo signals according to embodiments of methods of the invention.

The sampled sources may then go through a spatial filter. Mono-signals may again be transformed into stereo signals (but this time spatialized to the angle of trajectory) after going through the spatial filter defined in FIGS. 4a and 4b. In FIG. 4a, a monaural sound input A 38 of a particular source is input to a spatial filter 40 defined by $H(w,\theta)e^{-jw\tau_h(\theta)}$ to produce Left Channel Audio 42 of sound A; and is input to a spatial filter 44 defined by $H(w,\theta)e^{-jw\tau_h(\theta+180)}$ to produce Right Channel Audio 46 of sound A. Similarly, in FIG. 4b, a monaural sound input B 48 of a particular source is input to a spatial filter 50 defined by $H(w,\theta)e^{-jw\tau_h(\theta+180)}$ to produce Left Channel Audio 52 of sound B; and is input to a spatial filter 54 defined by $H(w,\theta)e^{-jw\tau_h(\theta)}$ to produce Right Channel Audio 56 of sound B.

Combining the different sources may be tricky, as the above table shows that each source may have a different sampling rate. Utilizing apriori information regarding the input source selection sampling rate based on the above table, the present invention may include asynchronous sample rate converters 58, 60, 62, 64 (FIG. 5) to assist in the mixing process.

Figure 5A:
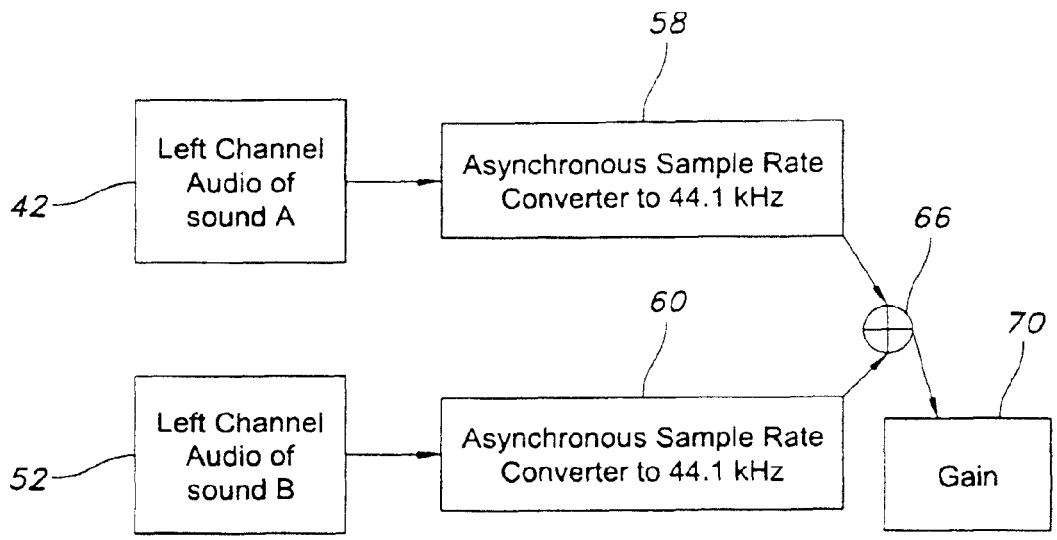
FIGS. 5A and 5B are block diagrams illustrating embodiments of an asynchronous sample rate conversion process of the present invention.
Figure 5B:
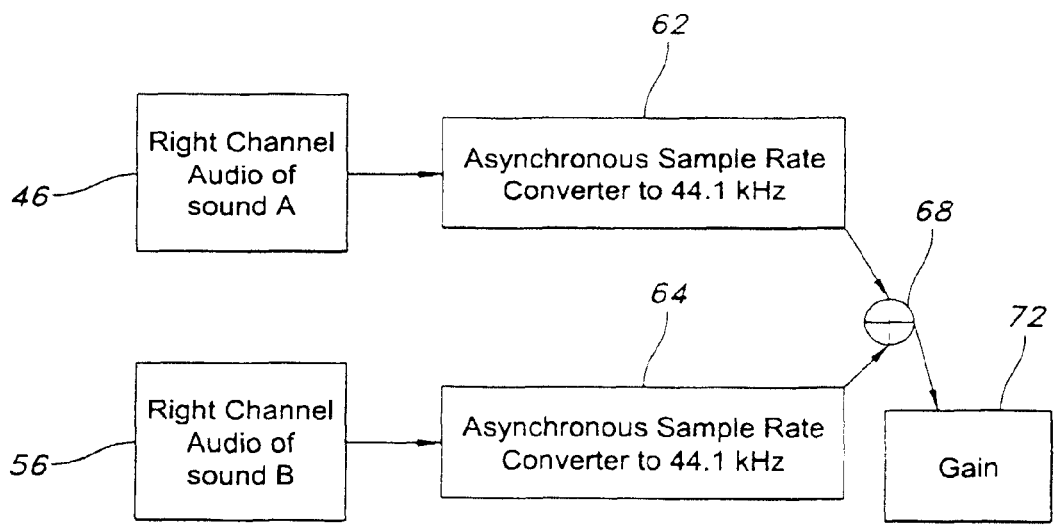

Converters 58, 60, 62, 64 may be disposed upstream of adders 66, 68. Adder 66 combines the Left Channel portions of sounds A and B. Similarly, adder 68 combines the Right Channel portions of sounds A and B. The common factor sampling rate in the embodiment of FIG. 5 is 44.1 kHz, which may advantageously provide signal fidelity and good resolution.

Gain blocks 70, 72 may compensate for the spectral amplitude scaling involved during asynchronous sample rate conversion. Asynchronous sample rate conversion typically involves upsampling followed by downsampling polyphase filter utilization.

In the simplest example context, assuming Sound A and Sound B are recorded at the same sampling rate, the following logic may be employed:

Output Right Channel Audio=0.5(Right Channel of Sound $B$)+0.5(Right Channel of Sound $A$)

Output Left Channel Audio=0.5(Left Channel of Sound $B$)+0.5(Left Channel of Sound $A$)

Asynchronous Sample Rate Converters 58, 60, 62, 64 may include an Audio Codec '97 to provide flexibility. That is, the Audio Codec '97 may support different output sample rates, although in the disclosed embodiment the output is 44.1 kHz. The data may be processed through filters 40, 44, 50, 54 and output to a high priority task which runs the Audio Codec '97.

Provided below is an example of simulation model code in Matlab programming language which implements logic. This simulation code may be run on an Intel Centrino Processor (x86 target).

```
A=wavread('sesame.wav');
B=wavread('knight.wav');
maxA=max(A);%Compute the maximum amplitude within signal A
maxB=max(B);%Compute the maximum amplitude within signal B
max_norm=max(maxA,maxB); %Find the maximum across signals A and B
```

```
A=A/max(max_norm);%Normalize the Input signal to the maximum
B=B/max(max_norm);%Normalize the Input signal to the maximum
%A and B are stereo signals both at same sampling rates
AL=hsfilter(60,8000,A); %Apply filter on left channel of Signal A
AR=hsfilter(240,8000,A); %Apply filter on right channel of Signal A
BL=hsfilter(240,8000,B); %Apply filter on left channel of Signal B
BR=hsfilter(60,8000,B); %Apply filter on right channel of Signal B
for i=1:1:length(A(1:10000))
y(i,1)=0.5*AL(i)+0.5*(BL(i)); %Combine the 2 signals onto one output left channel audio
y(i,2)=0.5*AR(i)+0.5*(BR(i)); %Combine the 2 signals onto one output right channel audio
end
%y-spatial audio which contains 2 audio sources each coming at 60 deg angle to azimuth.
```

Provided below is an example of a spatial filter algorithm in Matlab. The spatial filter models the head shadow and ITD effects, the shoulder echo and the pinna reflections.

```
function[output]=hsfilter(theta, Fs, input)
theta=theta+90;
theta0=150; alfa_min=0.05;
c=334;
a=0.08;
w0=c/a;
alfa=1+alfa_min+(1−alfa_min)*cos(theta/theta0*pi);
B=[(alfa+w0/Fs)/(1+w0/Fs),(−alfa+w0/Fs)/(1+w0/Fs)];
A=[1,−(1−w0/Fs)/(1+w0/Fs)];
if(abs(theta)<90)
    gdelay=−Fs/w0*(cos(theta*pi/180)−1)
else
    gdelay=Fs/w0*((abs(theta)−90)*pi/180)+1)
end
a=(1−gdelay)/(1+gdelay);
out_magn=filter(B,A,input);
output=filter([a,1],[1,a],out_magn);
```

It is possible for the sampled audio source to pan the audio from either left to right or right to left. If a spatial filter is applied to these input signals it makes it difficult for the end user to distinguish between the panned audio signal and the spatial effects that may be introduced. In order to prevent the user perception of the spatialized angle from being affected, the input signal may be converted to a monotone before being applied to the spatial filter. For example, a signal meant to be spatialized in the left 60 degree azimuthal plane should not exhibit a stronger spectral content on its right channel else it may hamper the algorithm's ability to spatialize the signal properly at the correct direction.

During use, the listener may be listening to a first source of an audio signal, such as AM radio, FM radio, CD, satellite radio, DVD, AUX, telephone, Onstar, USB, high definition radio, or DAB, for example. At some point in time, the listener may want to check out a second audio source while still continuing to monitor the first audio source to which he is listening. For example, the listener may be listening to a first audio source in the form of radio when the radio broadcast goes into a commercial break. Rather, than listen to the commercials, the listener may press a pushbutton, flip a switch, or vocalize a command instructing the audio system to go into a dual source mode in which the listener may continue to listen to the first audio source while interacting with the second audio source.

In one embodiment, the listener may interact with the second audio source by navigating through menu selections of the second audio source while still listening to the first source. Such menu selections may include radio frequencies, songs, albums and artists. The navigation of the menu selections of the second audio source may include scanning through and listening to audio of the menu selections in sequence while simultaneously continuing to listen to the first audio source. The navigation of the menu selections of the second audio source may additionally include scanning through and viewing the sequence of menu selections on display 34. In another embodiment, the navigation of the menu selections of the second audio source includes only viewing the menu selections on display 34 without additionally listening to the second audio source.

It is to be understood that the listener is not required to perform menu navigation in the second audio source. That is, the listener may simply listen to the second audio source simultaneously with the first audio source without performing any menu navigation. Similarly, while in the dual source mode, the listener may or may not perform menu navigation in the first audio source.

The user may return to the single source mode when he is ready to do so, such as when he hears that the commercial break on the first audio source is completed. Specifically, the listener may again press a pushbutton, flip a switch, or vocalize a command instructing the audio system to go into a single source mode in which the listener may go back to listening to the first audio source exclusively.

Figure 6:
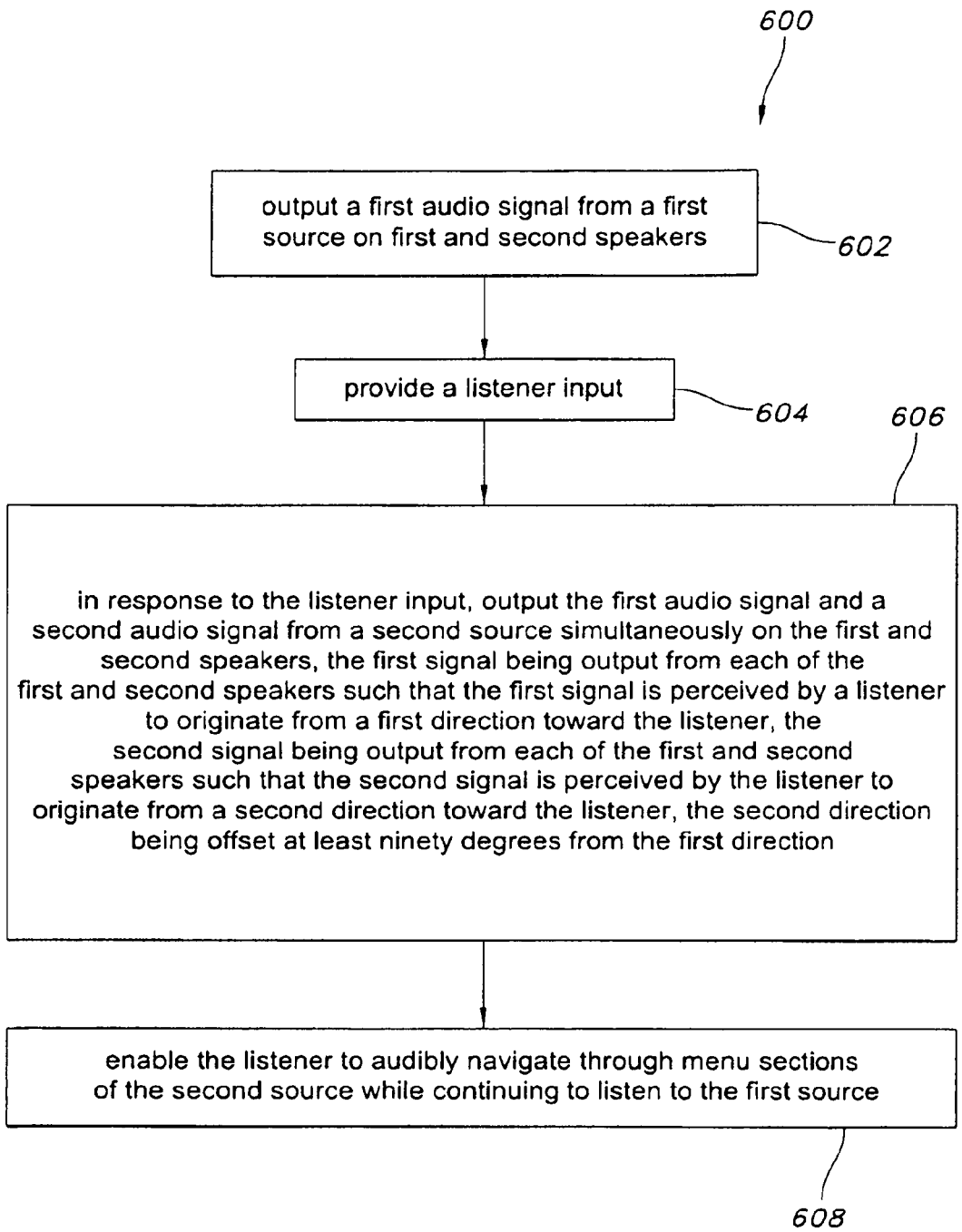
FIG. 6 is a flow chart illustrating one embodiment of a method of the present invention for operating an audio system.

One embodiment of a method 600 of the present invention for operating an audio system is illustrated in FIG. 6. In a first step 602, a first audio signal is output from a first source on first and second speakers. That is, an audio signal from an audio source such as a radio or CD may be audibly output on the two speakers of a pair of headphones. The speakers may be associated with the left ear and right ear, respectively, of the listener wearing the headphones.

Next, in step 604, a listener input may be provided. For example, the listener may press a pushbutton, flip a switch, or issue a voice command instructing the audio system to enter a dual audio source mode.

In a next step 606, in response to the listener input, the first audio signal and a second audio signal are output from a second source simultaneously on the first and second speakers, the first signal being output from each of the first and second speakers such that the first signal is perceived by a listener to originate from a first direction toward the listener, the second signal being output from each of the first and second speakers such that the second signal is perceived by the listener to originate from a second direction toward the listener, the second direction being offset at least ninety degrees from the first direction. In one embodiment, in response to the listener switching to the dual audio source mode, a first audio signal from a radio, for example, and a second audio signal from a CD, for example, are output simultaneously on the speakers of the headphone. The signal from the radio may be output from each of the headphone speakers such that the radio signal is perceived by a listener to originate from a direction generally to the left of the listener, for example. The signal from the CD may be output from each of the headphone speakers such that the CD signal is perceived by the listener to originate from a direction generally to the right of the listener, for example. Thus, the direction from which the CD is perceived to originate may be offset from the direction from which the radio is perceived to originate by at least ninety degrees. That is, the perceived directions from which the two sounds approach the listener may be offset from one another by approximately between ninety and one hundred eighty degrees.

In a final step 608, the listener is enabled to audibly navigate through menu selections of the second source while continuing to listen to the first source. That is, while in the dual audio source mode, the listener may provide further inputs that instruct the CD player to advance to the next song on the CD, or to the next CD. The song or CD menu selections may be presented to the listener audibly on the speakers and/or visually on display 34.

Figure 7:
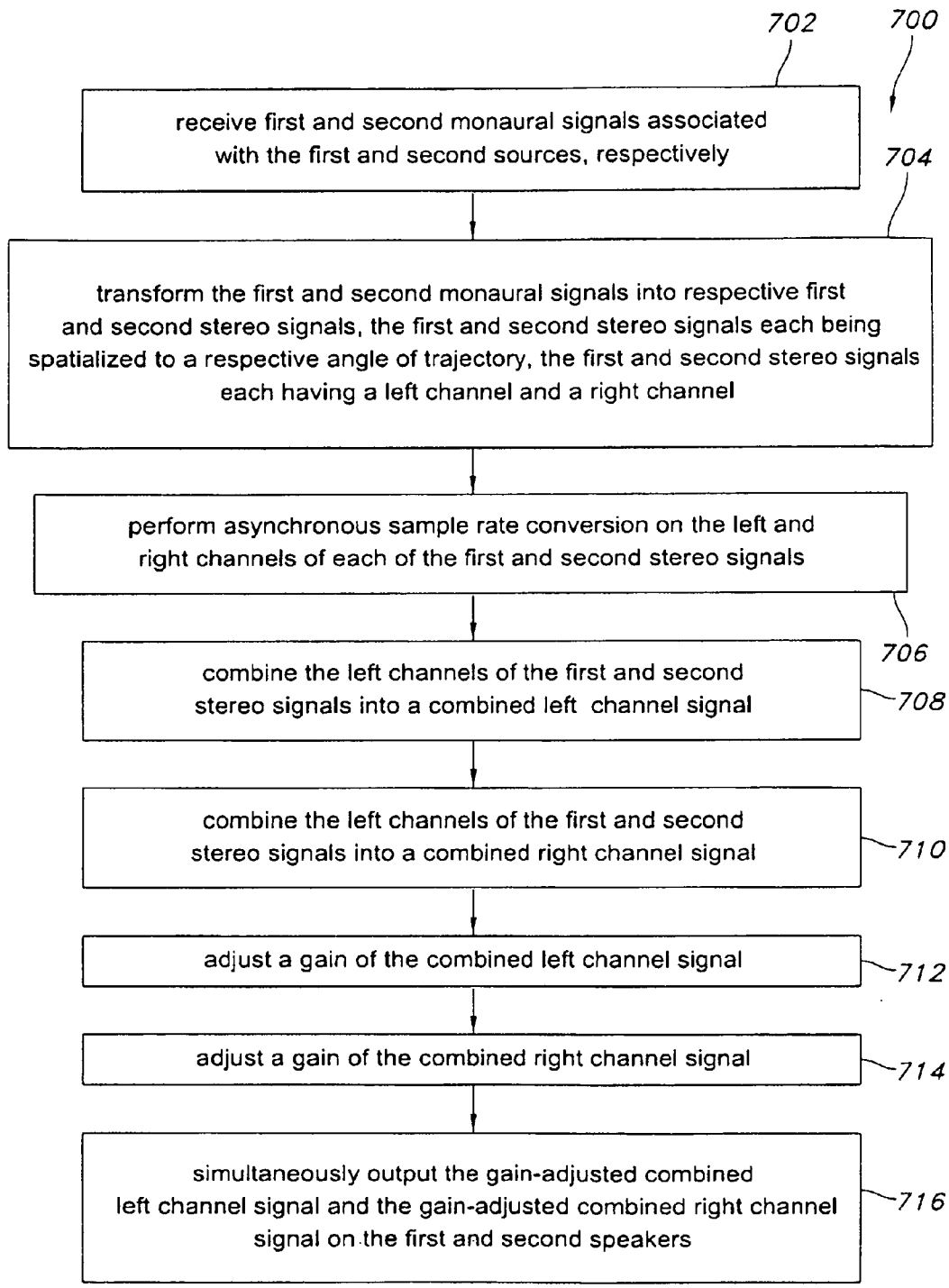
FIG. 7 is a flow chart illustrating another embodiment of a method of the present invention for operating an audio system.

Another embodiment of a method 700 of the present invention for operating an audio system is illustrated in FIG. 7. In a first step 702, first and second monaural signals associated with the first and second sources, respectively, are received. For example, first and second audio sources, such as a radio and a CD player, may each output a respective stereo signal. Depending upon the specific audio source, the table above describes how these stereo signals may be transformed into monaural signals associated with the radio and CD player, respectively.

Figure 4B:
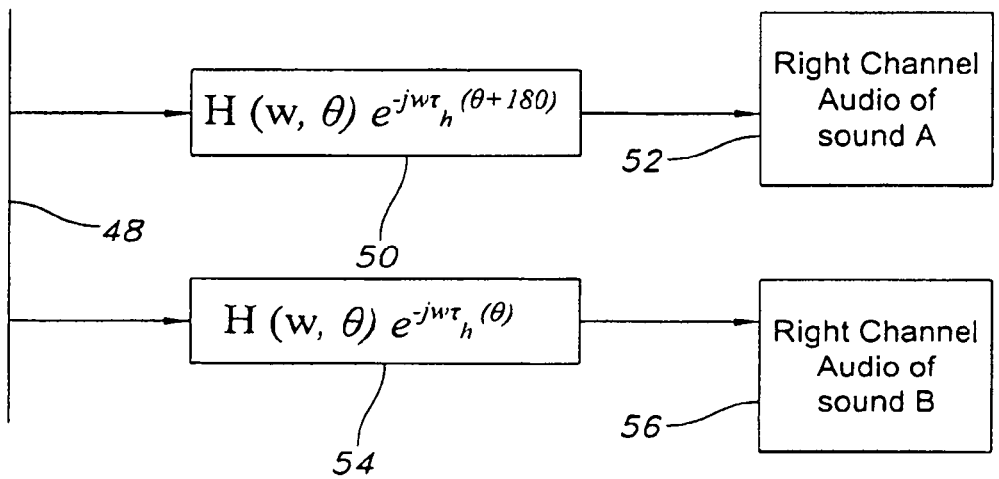

Next, in step 704, the first and second monaural signals are transformed into respective first and second stereo signals, the first and second stereo signals each being spatialized to a respective angle of trajectory, the first and second stereo signals each having a left channel and a right channel. In the embodiment of FIGS. 4a and 4b, the first and second monaural signals from the radio and CD player are each transformed into left and right channel stereo signals by spatial filters 40, 44, 50 and 54. Further, spatial filters 40, 44, 50 and 54 may spatialized each of the stereo signals to a respective angle of trajectory. More particularly, by controlling the relative loudnesses and/or phases of the left and right channels, spatial filters 40, 44, 50 and 54 may provide the stereo signals with characteristics that cause the human binaural system to perceive the stereo signals as coming from any desired directions in the azimuthal plane intersecting the ears.

In a next step 706, asynchronous sample rate conversion is performed on the left and right channels of each of the first and second stereo signals. That is, as shown in FIG. 5, asynchronous sample rate converters 58, 60, 62, 64 may be employed to perform asynchronous sample rate conversion on the left and right channels of both sound A and sound B.

In step 708, the left channels of the first and second stereo signals are combined into a combined left channel signal. That is, adder 66 combines the left channels of sounds A and B into a combined left channel signal.

In step 710, the right channels of the first and second stereo signals are combined into a combined right channel signal. That is, adder 68 combines the right channels of sounds A and B into a combined right channel signal.

Next, in step 712, a gain of the combined left channel signal is adjusted. In the embodiment of FIG. 5, for example, the combined left channel signal from adder 66 is fed into gain block 70 where the signal's gain is adjusted.

In a next step 714, a gain of the combined right channel signal is adjusted. In FIG. 5, specifically, the combined right channel signal from adder 68 is fed into gain block 72 where the signal's gain is adjusted.

In a final step 716, the gain-adjusted combined left channel signal and the gain-adjusted combined right channel signal are simultaneously output on the first and second speakers. That is, the gain-adjusted combined left channel signal from gain block 70 and the gain-adjusted combined right channel signal from gain block 72 are simultaneously output on the two speakers of the headphones, corresponding to the listener's left and right ears.

The present invention has been described herein as applying to headphone speakers. However, it is to be understood that the invention may more generally be applied to any multiple speaker audio system.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of operating an audio system having first and second sources and first and second speakers, the method comprising the steps of:
    receiving first and second monaural signals associated with the first and second sources, respectively;
    transforming the first and second monaural signals into respective first and second stereo signals, the first and second stereo signals each being spatialized to a respective angle of trajectory, the first and second stereo signals each having a left channel and a right channel;
    performing asynchronous sample rate conversion on the left and right channels of each of the first and second stereo signals, the asynchronous sample rate conversion including upsampling followed by utilization of a downsampling polyphase filter;
    combining the left channels of the first and second stereo signals into a combined left channel signal;
    combining the right channels of the first and second stereo signals into a combined right channel signal;
    adjusting a gain with which the combined left channel signal is amplified;
    adjusting a gain with which the combined right channel signal is amplified; and
    simultaneously outputting the gain-adjusted combined left channel signal and the gain-adjusted combined right channel signal on the first and second speakers.

2. The method of claim 1 comprising the further step of converting respective original stereo signals from the first and second sources into the first and second monaural signals.

3. The method of claim 1 comprising the further step of enabling the listener to audibly navigate through menu selections of the second source while continuing to listen to the first source.

4. The method of claim 1 wherein the transforming step includes inputting the first and second monaural signals into respective first and second spatial filters.

5. A method of operating an audio system having first and second sources and first and second speakers, the method comprising the steps of:
    receiving first and second monaural signals associated with the first and second sources, respectively;
    transforming the first and second monaural signals into respective first and second stereo signals, the first and second stereo signals each being spatialized to a respective angle of trajectory, the first and second stereo signals each having a left channel and a right channel;
    performing asynchronous sample rate conversion on the left and right channels of each of the first and second stereo signals;
    combining the left channels of the first and second stereo signals into a combined left channel signal;

combining the right channels of the first and second stereo signals into a combined right channel signal;

adjusting a gain with which the combined left channel signal is amplified;

adjusting a gain with which the combined right channel signal is amplified, wherein the adjusting steps include compensating for spectral amplitude scaling associated with the asynchronous sample rate conversion; and simultaneously outputting the gain-adjusted combined left channel signal and the gain-adjusted combined right channel signal on the first and second speakers.

6. The method of claim 1 wherein the first signal is output from each of the first and second speakers such that the first signal is perceived by a listener to originate from a first direction toward the listener, the second signal being output from each of the first and second speakers such that the second signal is perceived by the listener to originate from a second direction toward the listener, the second direction being offset at least ninety degrees from the first direction.

7. A method of operating an audio system having first and second sources and first and second speakers, the method comprising the steps of:

receiving first and second monaural signals associated with the first and second sources, respectively;

transforming the first and second monaural signals into respective first and second stereo signals, the first and second stereo signals each being spatialized to a respective angle of trajectory, the first and second stereo signals each having a left channel and a right channel;

performing asynchronous sample rate conversion on the left and right channels of each of the first and second stereo signals, the asynchronous sample rate conversion including upsampling followed by utilization of a downsampling polyphase filter;

combining the left channels of the first and second stereo signals into a combined left channel signal;

combining the right channels of the first and second stereo signals into a combined right channel signal; and simultaneously outputting the combined left channel signal and the combined right channel signal on the first and second speakers.

8. The method of claim 7 comprising the further steps of:

adjusting a gain with which the combined left channel signal is amplified; and adjusting a gain with which the combined left channel signal is amplified, wherein the simultaneously outputting step comprises simultaneously outputting the gain-adjusted combined left channel signal and the gain-adjusted combined right channel signal on the first and second speakers.

9. The method of claim 7 comprising the further step of converting respective original stereo signals from the first and second sources into the first and second monaural signals.

10. The method of claim 7 comprising the further step of enabling the listener to audibly navigate through menu selections of the second source while continuing to listen to the first source.

11. The method of claim 7 wherein the transforming step includes inputting the first and second monaural signals into respective first and second spatial filters.

12. A method of operating an audio system having first and second sources and first and second speakers, the method comprising the steps of:

receiving first and second monaural signals associated with the first and second sources, respectively;

transforming the first and second monaural signals into respective first and second stereo signals, the first and second stereo signals each being spatialized to a respective angle of trajectory, the first and second stereo signals each having a left channel and a right channel;

performing asynchronous sample rate conversion on the left and right channels of each of the first and second stereo signals;

combining the left channels of the first and second stereo signals into a combined left channel signal;

combining the right channels of the first and second stereo signals into a combined right channel signal;

adjusting a gain with which the combined left channel signal is amplified;

adjusting a gain with which the combined right channel signal is amplified, the adjusting steps including compensating for spectral amplitude scaling associated with the asynchronous sample rate conversion; and simultaneously outputting the combined left channel signal and the combined right channel signal on the first and second speakers.

13. The method of claim 7 wherein the first signal is output from each of the first and second speakers such that the first signal is perceived by a listener to originate from a first direction toward the listener, the second signal being output from each of the first and second speakers such that the second signal is perceived by the listener to originate from a second direction toward the listener, the second direction being offset at least ninety degrees from the first direction.

14. The method of claim 5 comprising the further step of converting respective original stereo signals from the first and second sources into the first and second monaural signals.

15. The method of claim 5 comprising the further step of enabling the listener to audibly navigate through menu selections of the second source while continuing to listen to the first source.

16. The method of claim 5 wherein the transforming step includes inputting the first and second monaural signals into respective first and second spatial filters.

17. The method of claim 5 wherein the first signal is output from each of the first and second speakers such that the first signal is perceived by a listener to originate from a first direction toward the listener, the second signal being output from each of the first and second speakers such that the second signal is perceived by the listener to originate from a second direction toward the listener, the second direction being offset at least ninety degrees from the first direction.

18. The method of claim 12 comprising the further step of converting respective original stereo signals from the first and second sources into the first and second monaural signals.

19. The method of claim 12 comprising the further step of enabling the listener to audibly navigate through menu selections of the second source while continuing to listen to the first source.

20. The method of claim 12 wherein the transforming step includes inputting the first and second monaural signals into respective first and second spatial filters.

* * * * *